United States Patent Office 2,880,014
Patented Mar. 31, 1959

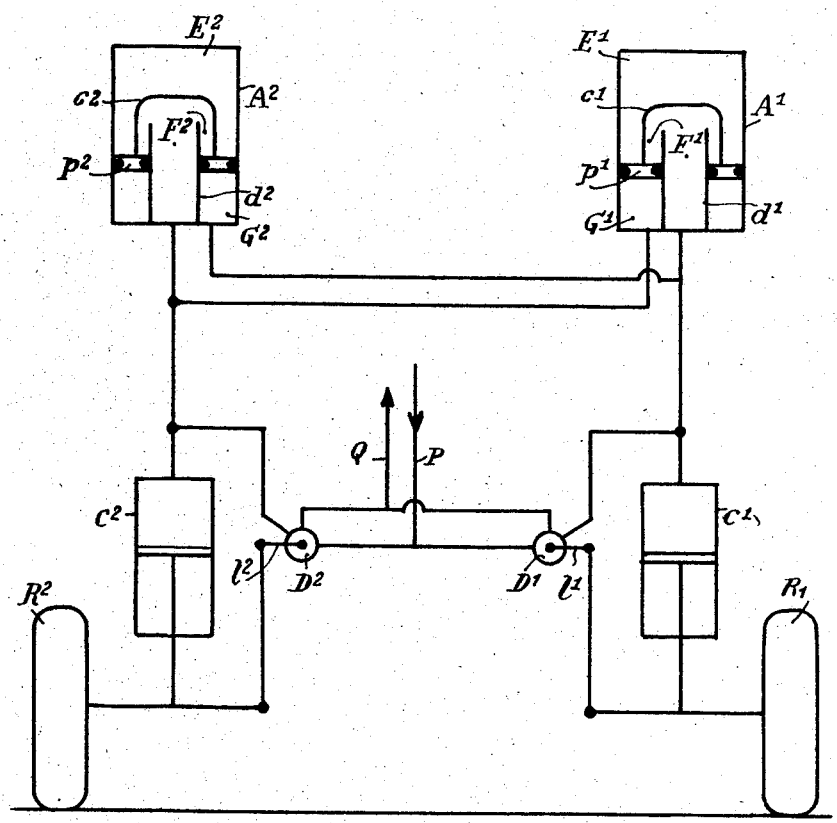

2,880,014
ANTI-ROLLING SYSTEM FOR AUTOMOBILE VEHICLES AND THE LIKE

René Lucien, Neuilly-sur-Seine, France, assignor to Societe a responsabilite limitee: Recherches Etudes Production R.E.P., Paris, France, a corporation of France Application April 15, 1957, Serial No. 652,747

Claims priority, application France April 14, 1956

4 Claims. (Cl. 280—112)

The invention relates to oleo-pneumatic suspension systems for vehicles, of the kind in which purely hydraulic suspension cylinders, that is to say filled with liquid, are coupled to compressed-air accumulators.

It is especially but not exclusively concerned with systems of this kind, in which the adjustment of the suspension in dependence on the load is effected under conditions such that the mean position of the chassis remains at a fixed height from the ground by the automatic action of distributors which can place a source of liquid under pressure, such as a pump, in communication with the said cylinders and accumulators, or alternatively with a circuit coupled to the reservoir which supplies the pump.

In certain known types of suspension of this kind, and especially that which formed the object of French Patent No. 1,098,063 of Dec. 18, 1953, the front cylinders are conjointly operated and so are also the rear cylinders, so that the transverse stability is ensured by the action of mechanical anti-rolling devices which co-operate with the suspension in the usual way, the distributors being operated by forks mounted at the centre of a corresponding anti-rolling shaft.

In other kinds of suspension, and especially that which formed the subject of French Patent No. 1,110,452 of September 2, 1954, the anti-rolling effect is obtained by the fact that, between each of the wheels and a corresponding point of the chassis, there is interposed a hydraulic jack coupled to a separate distributor actuated by the relative displacements of the chassis and of the said wheel.

The device in accordance with the present invention is characterised in that with each wheel there is associated a hydraulic suspension cylinder and an oleo-pneumatic accumulator with a separator piston, which provides two separate chambers for the liquid, the chambers being connected, one to the said cylinder and the other to the cylinder associated with the other wheel of the same pair, front or rear.

By virtue of this double crossed connection, an anti-rolling effect is obtained. Any lateral acceleration, for example at a turning, produces an increase of pressure in one of the cylinders and a reduction of pressure in the other. These variations are equal and of opposite sense, since the weight of the vehicle remains constant. Since a single separator piston is subjected to the pressures in the two cylinders, there is thus produced a compensating effect which reduces or eliminates the rolling movement.

The invention is illustrated diagrammatically in the single accompanying drawing.

Between each of the wheels $R^1$—$R^2$ of the front or rear trains of the vehicle and an adjacent point of the chassis, there is interposed a hydraulic suspension cylinder $C^1$—$C^2$.

In accordance with an arrangement which is known per se, the admission of liquid to the cylinders and, alternatively its evacuation, are controlled by distributors $D^1$—$D^2$ respectively, coupled on the one hand to a source of fluid under pressure by a piping system P, and on the other hand to a reservoir by a piping system Q.

The distributors are themselves controlled by levers $l_1$—$l_2$, which are actuated by the relative movement of the chassis with respect to the ground when the load on the vehicle varies.

In accordance with the present invention, each cylinder $C^1$—$C^2$ is coupled to an oleo-pneumatic accumulator $A^1$—$A^2$ and each of these identical accumulators is divided into two separate chambers for the liquid.

To this end, these accumulators are provided with a central socket $d_1$ or $d_2$, which is surrounded in a fluid-tight manner by an annular piston $p^1$ or $p^2$, carrying a bell $c^1$ or $c^2$. The free space $E^1$ or $E^2$ above the piston-bell assembly is filled with compressed air. The sockets are identical for both accumulators and the same thing is true of the annular pistons.

The separate chambers provided for the liquid are constituted, in the case of $F^1$ or $F^2$, by the internal space common to the socket and the bell, and in the case of the other $C^1$ or $C^2$, by the annular space located below the separator piston $p^1$ or $p^2$.

The chambers $F^1$—$F^2$ are connected to the corresponding cylinder $C^1$ or $C^2$.

On the other hand, the chambers $G^1$—$G^2$ are coupled to the opposite cylinder $C^2$ or $C^1$ respectively.

The operation of the device is as follows:

When the vehicle is running in a straight line, without lateral acceleration, the pressures in the two cylinders are equal to a value $p$, and the pressure of air $\pi$ is the same in the two accumulators.

When a lateral acceleration occurs, it is balanced by an increase in pressure $\Delta p$ in one cylinder and a reduction in pressure $-\Delta p$ in the other. The hydraulic force applied to each of the two separator pistons varies. By indicating by S the section of each of the sockets, and by s the area of each of the annular pistons, this variation is an increase for one of $\Delta p(S-s)$; for the other the reduction is equal to the inverse. It follows that the air pressures $\Delta \pi$ will vary in the opposite sense. The equilibrium of the piston shows that:

$$\Delta\pi = \frac{S-s}{S+s}\Delta p$$

There is thus produced a movement of each of the separator pistons, which movement shows itself by a rolling of the vehicle.

From the equation given above: If $S=s$, $\Delta\pi=0$: the vehicle moves parallel to itself. There is a complete compensation and no rolling movement results. If $s=0$, $\Delta\pi=\Delta p$. The case is then that of the usual types of oleo-pneumatic suspension. There is no anti-rolling effect.

If a maximum angle of rolling has been fixed for a given lateral acceleration, the equations given above enable the difference $S-s$ to be chosen.

A suspension system of this kind thus constitutes a kind of anti-rolling "hydraulic bar," by analogy with mechanical anti-rolling bars. This system has the fundamental advantage that it requires no consumption of energy, since when the vehicle is turning the distributors $D^1$—$D^2$ play no part in supplying the suspension cylinders.

In order to ensure the "filtration" of rapid oscillations of the wheels with respect to the chassis, the distributors may be controlled by means of flexible members of the elastic blade type, while at the same time an inertia mass is associated with their moving member, as indicated in French Patent No. 1,110,470 of September 3, 1954.

What I claim is:

1. An anti-rolling suspension for an automobile vehicle and the like having pairs of wheels and a chassis supported by the wheels, comprising: associated with each wheel, an individual, hydraulic suspension cylinder responsive to vertical reaction of the wheel and an individual oleo-pneumatic accumulator; and means dividing each said accumulator into three chambers, of which one is filled with a fixed quantity of compressed air while the two others are filled with liquid and are respectively hydraulically connected, one to the suspension cylinder corresponding to the said accumulator, and the other to the suspension cylinder associated with the other wheel of the same pair of wheels.

2. An anti-rolling system for an automobile vehicle and the like having pairs of wheels, comprising: associated with each wheel, an individual, purely hydraulic suspension cylinder and an individual oleo-pneumatic accumulator hydraulically coupled to the said cylinder; in each said accumulator a socket mounted on the bottom of the accumulator, an annular piston mounted on the said socket and adapted to slide on the said socket in a fluid-tight manner; a bell surmounting and forming a cap for the said socket and defining a space therewith, the bell being carried by the said annular piston; compressed air in the said accumulator above the said piston and bell; a hydraulic coupling between said space and the hydraulic cylinder corresponding to the said accumulator; a further hydraulic coupling between a space in the accumulator external to the said socket and the hydraulic cylinder associated with the other wheel of the same pair.

3. In an anti-rolling suspension according to claim 1; a source of liquid under pressure; a reservoir for the said liquid; for each wheel, a distributor connected on the one hand to the said source of liquid under pressure and on the other hand to the said reservoir; and means responsive to the relative displacement of the chassis of the vehicle with respect to the ground, the said means being adapted to actuate the distributors.

4. In an anti-rolling suspension according to claim 1; a source of liquid under pressure; a reservoir for the said liquid; for each wheel, a distributor coupled on the one hand to the said source of liquid under pressure, and on the other hand to the said reservoir; and lever means responsive to the relative displacement of the chassis of the said vehicle with respect to the ground, the said lever means being adapted to actuate the distributors.

References Cited in the file of this patent

UNITED STATES PATENTS

| | | |
|---|---|---|
| 1,647,518 | Hawley | Nov. 1, 1927 |
| 2,139,178 | Stevens | Dec. 6, 1938 |
| 2,593,040 | Lloyd | Apr. 15, 1952 |